US012643364B2

(12) United States Patent
Lenniger et al.

(10) Patent No.: US 12,643,364 B2
(45) Date of Patent: Jun. 2, 2026

(54) HYDRAULIC SYSTEM FOR A HYDRAULICALLY ADJUSTABLE VEHICLE SHOCK ABSORBER

(71) Applicant: Dr. Ing. h.c. F. Porsche Aktiengesellschaft, Stuttgart (DE)

(72) Inventors: Christoph Lenniger, Renningen (DE); Jochen Liebold, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 405 days.

(21) Appl. No.: 18/232,908

(22) Filed: Aug. 11, 2023

(65) Prior Publication Data

US 2024/0149631 A1 May 9, 2024

(30) Foreign Application Priority Data

Nov. 7, 2022 (DE) ..................... 10 2022 129 265.7

(51) Int. Cl.
*B60G 17/04* (2006.01)
(52) U.S. Cl.
CPC .... *B60G 17/0408* (2013.01); *B60G 2202/154* (2013.01); *B60G 2202/416* (2013.01); *B60G 2206/7105* (2013.01)
(58) Field of Classification Search
CPC .......... B60G 17/0408; B60G 2202/154; B60G 2202/416; B60G 2206/7105; F16F 2230/22; F04B 43/0072
See application file for complete search history.

(56) References Cited

U.S. PATENT DOCUMENTS

| | | | |
|---|---|---|---|
| 3,250,224 A * | 5/1966 | Phillips .................. | F02M 17/04 |
| | | | 92/102 |
| 5,087,073 A * | 2/1992 | Lund ....................... | F16F 9/512 |
| | | | 188/266.2 |
| 10,562,365 B2 | 2/2020 | Schmidt | |
| 2014/0288776 A1* | 9/2014 | Anderson ............... | F16F 9/064 |
| | | | 701/37 |
| 2018/0154728 A1 | 6/2018 | Giovanardi et al. | |
| 2021/0172463 A1 | 6/2021 | Tucker et al. | |
| 2022/0185056 A1 | 6/2022 | Belter et al. | |

FOREIGN PATENT DOCUMENTS

| | | |
|---|---|---|
| DE | 102009056874 A1 | 7/2010 |
| DE | 102015214429 A1 | 2/2017 |
| DE | 102019115492 A1 | 12/2020 |
| GB | 2283075 A | 4/1995 |
| WO | 2015165910 A2 | 11/2015 |
| WO | 2018092111 A1 | 5/2018 |

OTHER PUBLICATIONS

Great Britain Combined Search and Examination Report for Application No. GB2316725.7, dated Apr. 23, 2024 (2 pages).

* cited by examiner

*Primary Examiner* — David R Morris
(74) *Attorney, Agent, or Firm* — Buchanan Ingersoll & Rooney PC

(57) ABSTRACT

A hydraulic system for a hydraulically adjustable vehicle shock absorber including a piston and at least one pressure chamber cooperating hydraulically with the piston, a hydraulic pump configured so as to convey the hydraulic fluid (F), and a hydraulic conduit assembly, via which the at least one pressure chamber of the hydraulically adjustable vehicle shock absorber is connected to the hydraulic pump. At least one elastically deformable damping element is in contact with the hydraulic fluid (F).

16 Claims, 1 Drawing Sheet

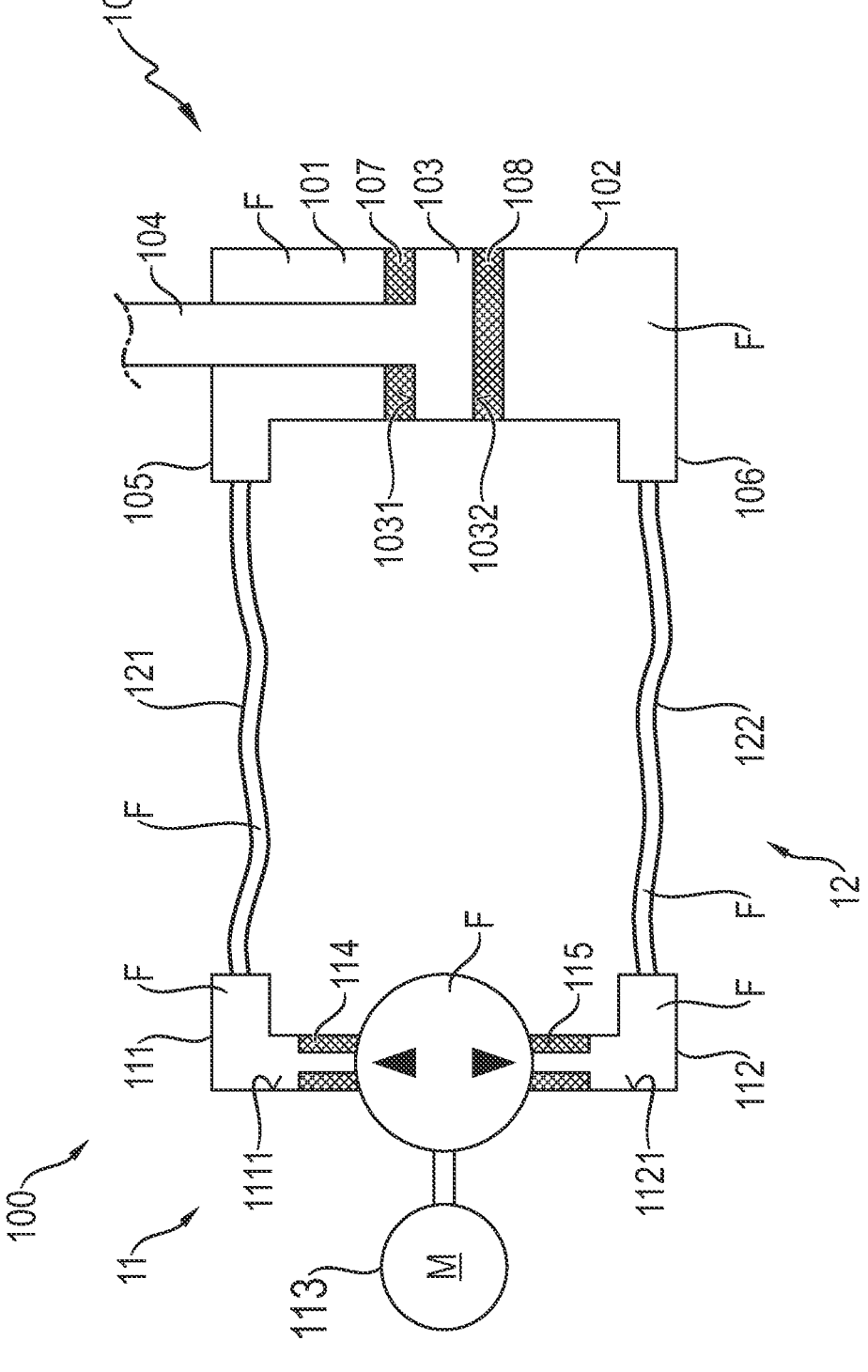

HYDRAULIC SYSTEM FOR A HYDRAULICALLY ADJUSTABLE VEHICLE SHOCK ABSORBER

CROSS-REFERENCE TO RELATED APPLICATION

This application claims priority to German Patent Application No. 10 2022 129 265.7, filed Nov. 7, 2022, the content of such application being incorporated by reference herein in its entirety.

FIELD OF THE INVENTION

The present invention relates to a hydraulic system for a hydraulically adjustable vehicle shock absorber, comprising: a hydraulic fluid, the hydraulically adjustable vehicle shock absorber, which comprises a piston and at least one pressure chamber cooperating hydraulically with the piston, a hydraulic pump configured so as to convey the hydraulic fluid, and a hydraulic conduit assembly, via which the at least one pressure chamber of the hydraulically adjustable vehicle shock absorber is connected to the hydraulic pump.

BACKGROUND OF THE INVENTION

Such a hydraulic system is known from DE 10 2019 115 492 A1, which is incorporated by reference herein, for example. It is problematic in the case of such hydraulic systems that pressure fluctuations, so-called pressure pulsations, are caused by the hydraulic pump during operation in the hydraulic system, which pressure pulsations are transferred to the piston of the vehicle shock absorber via the hydraulic fluid. In particular, if a frequency of the pressure pulsations lies in the range of a resonance frequency of the hydraulic system, a significant impairment of the damping properties of the vehicle shock absorber can be caused.

SUMMARY OF THE INVENTION

The hydraulic system according to the present invention for a hydraulically adjustable vehicle shock absorber comprises a hydraulic fluid as the working medium. The hydraulic fluid is typically a special hydraulic oil.

The hydraulic system according to the present invention for a hydraulically adjustable vehicle shock absorber comprises the hydraulically adjustable vehicle shock absorber, which comprises an axially movable piston, to which a piston rod is attached, and at least one pressure chamber that cooperates hydraulically with the piston in the manner known per se. The at least one pressure chamber and the piston cooperate with one another in particular such that, by adjusting a hydraulic pressure within the at least one pressure chamber, at least one property of the shock absorber, for example a damping factor or an axial piston position determining a ground clearance of the vehicle, can be adjusted.

The hydraulic system according to aspects of the invention for a hydraulically adjustable vehicle shock absorber comprises a hydraulic pump that is configured so as to convey the hydraulic fluid in the manner known per se. Specifically, the hydraulic pump comprises at least two ports and is configured so as to draw in the hydraulic fluid via at least one of the ports and to expel it via at least one other of the ports. The hydraulic pump is preferably configured as a displacement pump and preferably comprises an electric drive motor.

The hydraulic system according to the present invention for a hydraulically adjustable vehicle shock absorber comprises a hydraulic conduit assembly, via which the at least one pressure chamber of the hydraulically adjustable vehicle shock absorber is connected to the hydraulic pump. The hydraulic conduit assembly typically includes multiple conduits that are filled with the hydraulic fluid during operation and form a closed hydraulic circuit. The hydraulic conduit assembly preferably comprises a conduit that creates a direct connection between a port of the hydraulic pump and a port of the hydraulically adjustable vehicle shock absorber associated with a pressure chamber. The hydraulic conduit assembly preferably comprises at least one hose line.

According to the present invention, the hydraulic system for a hydraulically adjustable vehicle shock absorber comprises at least one elastically deformable damping element that is in direct contact with the hydraulic fluid, so that the damping element can interact with the hydraulic fluid. The damping element, in particular a compressibility of the damping element, is configured such that the damping element can be elastically deformed by pressure pulsations transferred via the hydraulic fluid, whereby the pressure pulsations are at least partially compensated. The elastically deformable damping element, which is present according to aspects of the invention and interacts with the hydraulic fluid, thus enables reliable operation of the hydraulically adjustable vehicle shock absorber.

A particularly reliable and variable adjustment of the hydraulically adjustable vehicle shock absorber is enabled in that, in a preferred embodiment of the hydraulic system according to the present invention, the hydraulically adjustable vehicle shock absorber comprises a first pressure chamber and a second pressure chamber that cooperate hydraulically with the piston in an opposing manner. In general, the two pressure chambers are arranged on opposite axial sides of the piston, so that hydraulic fluid present in the two pressure chambers acts upon opposing surfaces of the piston.

Preferably, the hydraulic pump comprises a first port connected to the first pressure chamber via the hydraulic conduit assembly and a second port connected to the second pressure chamber via the hydraulic conduit assembly, and the hydraulic pump is configured so as to selectively convey the hydraulic fluid from the first port to the second port or vice versa from the second port to the first port. Thus, depending on the conveying direction of the hydraulic pump, hydraulic fluid can either be conveyed from the first pressure chamber into the second pressure chamber or vice versa can be conveyed from the second pressure chamber into the first pressure chamber. This allows for a particularly reliable and variable adjustment of the hydraulically adjustable vehicle shock absorber.

Preferably, the hydraulic pump is configured as an internal gear pump, which allows for relatively uniform conveyance of the hydraulic fluid and generation of relatively high hydraulic pressures.

An inexpensive and easily assembled elastically deformable damping element can be realized in that, in a preferred embodiment of the hydraulic system according to aspects of the invention, the elastically deformable damping element contains a foam material.

Preferably, at least one elastically deformable damping element is arranged on the hydraulically adjustable vehicle shock absorber in order to compensate for pressure pulsations directly on the hydraulically adjustable vehicle shock absorber and thus to allow a reliable operation of the hydraulically adjustable vehicle shock absorber.

Preferably, an elastically deformable damping element is arranged in at least one pressure chamber of the hydraulically adjustable vehicle shock absorber in order to compensate for pressure pulsations directly in the pressure chamber.

To the extent to which the hydraulically adjustable vehicle shock absorber comprises a first pressure chamber and a second pressure chamber as described above, a respective elastically deformable damping element is preferably arranged in the two pressure chambers, so that pressure pulsations in both pressure chambers of the hydraulically adjustable vehicle shock absorber are compensated.

A transfer of pressure pulsations into the piston of the hydraulically adjustable vehicle shock absorber can be minimized in that, in a preferred embodiment of the hydraulic system, at least one elastically deformable damping element is arranged on a surface of the piston that delimits a pressure chamber of the hydraulically adjustable vehicle shock absorber. Preferably, a respective elastically deformable damping element is arranged on each surface of the piston delimiting a pressure chamber. This allows for a particularly reliable operation of the hydraulically adjustable vehicle shock absorber.

In a preferred embodiment of the hydraulic system, in order to compensate for pressure pulsations directly at the source, at least one elastically deformable damping element is arranged on the hydraulic pump.

Preferably, on at least one port of the hydraulic pump, particularly preferably on an outlet port of the hydraulic pump from which the hydraulic fluid is discharged during operation of the hydraulic pump, an elastically deformable damping element is arranged in order to compensate for pressure pulsations before they are transferred to the hydraulic conduit system.

Inasmuch as the hydraulic pump comprises two ports as described above and is configured so as to selectively discharge hydraulic fluid via one port or via the other port, in each case an elastically deformable damping element is preferably arranged on the two ports of the hydraulic pump in order to enable a compensation of pressure pulsations independently of the direction of conveyance of the hydraulic pump before they are transferred into the hydraulic conduit system.

An embodiment example of the present invention is described below on the basis of the attached FIGURE, which shows a schematic diagram of a hydraulic system according to aspects of the invention for a hydraulically adjustable vehicle shock absorber.

BRIEF DESCRIPTION OF THE DRAWING

The sole FIGURE shows a hydraulic system for a hydraulically adjustable vehicle shock absorber.

DETAILED DESCRIPTION OF THE INVENTION

The sole FIGURE shows a hydraulic system 100 according to aspects of the invention for a hydraulically adjustable vehicle shock absorber 10, which, in addition to the hydraulically adjustable vehicle shock absorber 10, comprises a hydraulic pump 11 and a hydraulic conduit assembly 12, via which a hydraulic fluid F can be conveyed to the hydraulically adjustable vehicle shock absorber 10 by means of the hydraulic pump 11.

The hydraulically adjustable vehicle shock absorber 10 comprises a first pressure chamber 101 and a second pressure chamber 102, both of which are filled with hydraulic fluid F and hydraulically cooperate with a piston 103, to which a piston rod 104 is attached. The two pressure chambers 101, 102 are formed on opposite sides of the piston 103 and consequently hydraulically cooperate in an opposing manner with the piston 103, thus pushing the piston 103 in opposite axial directions during filling of the respective pressure chamber 101, 102. The first pressure chamber 101 is connected to a first hose line 121 of the hydraulic conduit assembly 12 via a port 105, and the second pressure chamber 102 is connected to a second hose line 122 of the hydraulic conduit assembly 12 via a port 106.

An elastically deformable damping element 107 is arranged on a surface 1031 of the piston 103 that delimits the first pressure chamber 101, which element is in contact with the hydraulic fluid F located in the first pressure chamber 101. A elastically deformable damping element 108 is arranged on a surface 1032 of the piston 103 that delimits the second pressure chamber 102, which element is in contact with the hydraulic fluid F located in the second pressure chamber 102. The two elastically deformable damping elements 107, 108 respectively contain a foam material.

The hydraulic pump 11 is configured as an internal gear pump and comprises a first port 111 connected to the port 105 of the first pressure chamber 101 via the first hose line 121 and a second port 112 connected to the port 106 of the second pressure chamber 102 via the second hose line 122. The hydraulic pump 11 comprises an electric drive motor 113, which can be operated in both directions of travel. The hydraulic pump 11 is thus configured so as to selectively convey the hydraulic fluid F from the first port 111 to the second port 112 or vice versa from the second port 112 to the first port 111.

An elastically deformable damping element 114 is arranged on an inner peripheral surface 1111 of the first port 111 of the hydraulic pump 11, which element is in contact with the hydraulic fluid F pumped through the first port 111. An elastically deformable damping element 115 is arranged on an inner peripheral surface 1121 of the second port 112 of the hydraulic pump 11, which element is in contact with the hydraulic fluid F pumped through the first port 111. The two elastically deformable damping elements 114, 115 respectively contain a foam material.

What is claimed is:

1. A hydraulic system comprising:
   a hydraulic pump configured to convey a hydraulic fluid,
   a hydraulically adjustable vehicle shock absorber comprising a piston rod, a piston that is fixed to one end of the piston rod such that the piston moves with the piston rod, and a first pressure chamber and a second pressure chamber which hydraulically cooperate with the piston in an opposing manner,
   at least one elastically deformable damping element that is positioned to be in contact with the hydraulic fluid, and
   a hydraulic conduit assembly via which the first and second pressure chambers of the hydraulically adjustable vehicle shock absorber are connected to the hydraulic pump,
   wherein the at least one elastically damping element comprises a first deformable damping element arranged in the first pressure chamber and a second deformable damping element arranged in the second pressure chamber,
   wherein the first deformable damping element is arranged on a first surface of the piston that delimits the first pressure chamber, and the second deformable damping element is arranged on a second surface of the piston that delimits the second pressure chamber.

2. The hydraulic system according to claim 1, wherein the hydraulic pump comprises:

a first port connected to the first pressure chamber via the hydraulic conduit assembly, and a second port connected to the second pressure chamber via the hydraulic conduit assembly, wherein the hydraulic pump is configured to selectively convey the hydraulic fluid (F) from the first port to the second port or vice versa from the second port to the first port.

3. The hydraulic system according to claim 1, wherein the hydraulic pump is an internal gear pump.

4. The hydraulic system according to claim 1, wherein each damping element comprises a foam material.

5. The hydraulic system according to claim 1, wherein a third deformable damping element is arranged on the hydraulic pump.

6. The hydraulic system according to claim 5, wherein the third damping element is arranged at at least one port of the hydraulic pump.

7. The hydraulic system according to claim 5, wherein the third deformable damping element is arranged at a first port of the hydraulic pump and a fourth deformable damping element is arranged at a second port of the hydraulic pump.

8. The hydraulic system according to claim 1 further comprising the hydraulic fluid.

9. A vehicle comprising the hydraulic system according to claim 1.

10. The hydraulic system according to claim 1, wherein the first deformable damping element has a constant cross-sectional thickness and extends across an entirety of a width of the first pressure chamber, wherein the second deformable damping element has a constant cross-sectional thickness and extends across an entirety of a width of the second pressure chamber.

11. The hydraulic system according to claim 1, wherein the width of the first pressure chamber is equal to the width of the second pressure chamber.

12. A hydraulic system comprising:

a hydraulic pump configured to convey a hydraulic fluid, a hydraulically adjustable vehicle shock absorber comprising a piston and at least one pressure chamber that cooperates hydraulically with the piston, at least one elastically deformable damping element that is positioned to be in contact with the hydraulic fluid and arranged at at least one port of the hydraulic pump through which the hydraulic fluid either enters or exits the hydraulic pump, and a hydraulic conduit assembly connected to the at least one port via which the at least one pressure chamber of the hydraulically adjustable vehicle shock absorber is connected to the hydraulic pump, wherein the at least one elastically deformable damping element has an opening that defines either an entrance or exit to the hydraulic pump such that the hydraulic fluid is forced to either enter or exit the hydraulic pump via the opening.

13. The hydraulic system according to claim 12, wherein the at least one port of the hydraulic pump comprises an inlet port and an outlet port, wherein the at least one elastically deformable damping element comprises a first elastically deformable damping element that is arranged at the inlet port and a second elastically deformable damping element that is arranged at the outlet port.

14. The hydraulic system according to claim 13, wherein the first and second elastically deformable damping elements are identical.

15. The hydraulic system according to claim 13, wherein diameters of the first and second elastically deformable damping elements correspond to diameters of the inlet and outlet ports, respectively.

16. The hydraulic system according to claim 12, wherein the openings of the first and second elastically deformable damping elements are oriented parallel with respect to one another.

\* \* \* \* \*